United States Patent [19]

Von Holdt

[11] Patent Number: 4,533,312
[45] Date of Patent: Aug. 6, 1985

[54] SIMPLIFIED COLLAPSIBLE MOLD CORE

[76] Inventor: John W. Von Holdt, 6864 Lexington La., Niles, Ill. 60648

[21] Appl. No.: 453,230

[22] Filed: Dec. 27, 1982

[51] Int. Cl.³ .......................... B29C 1/06; B29F 1/022
[52] U.S. Cl. .................................... 425/438; 249/142; 249/152; 249/180; 425/443; 425/DIG. 5; 425/DIG. 58
[58] Field of Search .............. 249/142, 152, 144, 178, 249/180, 184, 58; 425/DIG. 5, 443, 457, 547, 556, 577, 438, 441, 414, DIG. 58

[56] References Cited

U.S. PATENT DOCUMENTS

| | | | |
|---|---|---|---|
| 3,373,460 | 3/1968 | Ladney | 249/152 |
| 3,482,815 | 12/1969 | Naturale | 425/414 |
| 3,843,088 | 10/1974 | McLoughlin et al. | 425/DIG. 5 |
| 3,989,439 | 11/1976 | Schmitzberger | 425/457 |
| 4,114,849 | 9/1978 | von Holdt | 249/58 |
| 4,125,246 | 11/1978 | von Holdt | 249/144 |
| 4,172,577 | 10/1979 | von Holdt | 249/58 |
| 4,286,766 | 9/1981 | von Holdt | 249/144 |
| 4,362,291 | 12/1982 | Fuke et al. | 249/180 |
| 4,378,928 | 4/1983 | Kopp et al. | 249/144 |
| 4,383,819 | 5/1983 | Letico | 425/556 |

Primary Examiner—Willard E. Hoag
Attorney, Agent, or Firm—Charles F. Pigott, Jr.

[57] ABSTRACT

A collapsible mold core having plural can actuated members surrounding a conical central core member, the members surrounding the central core member having slidable pins connecting adjacent members and molding apparatus including the core.

12 Claims, 15 Drawing Figures

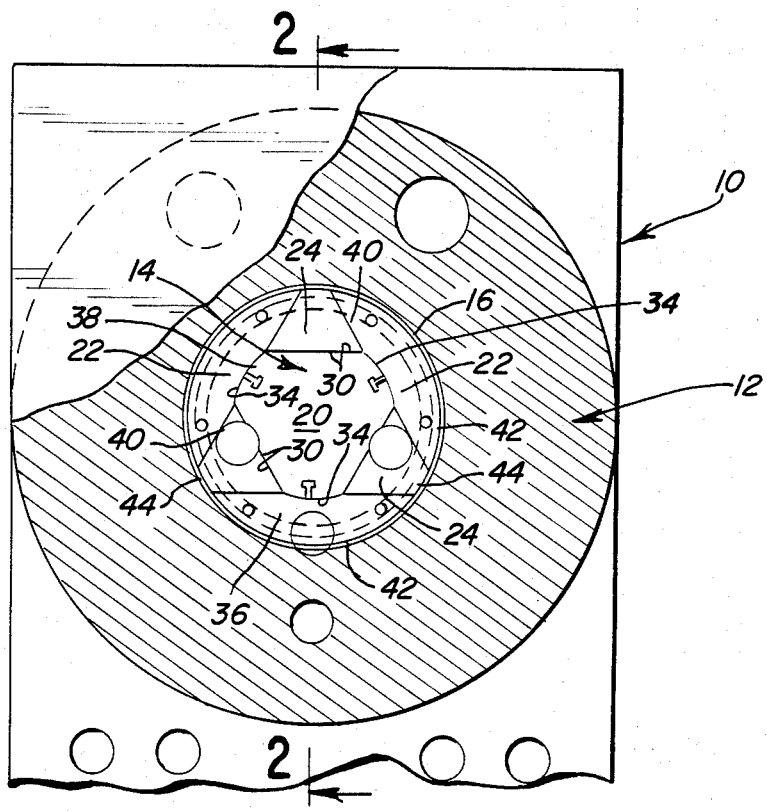
FIG. 1
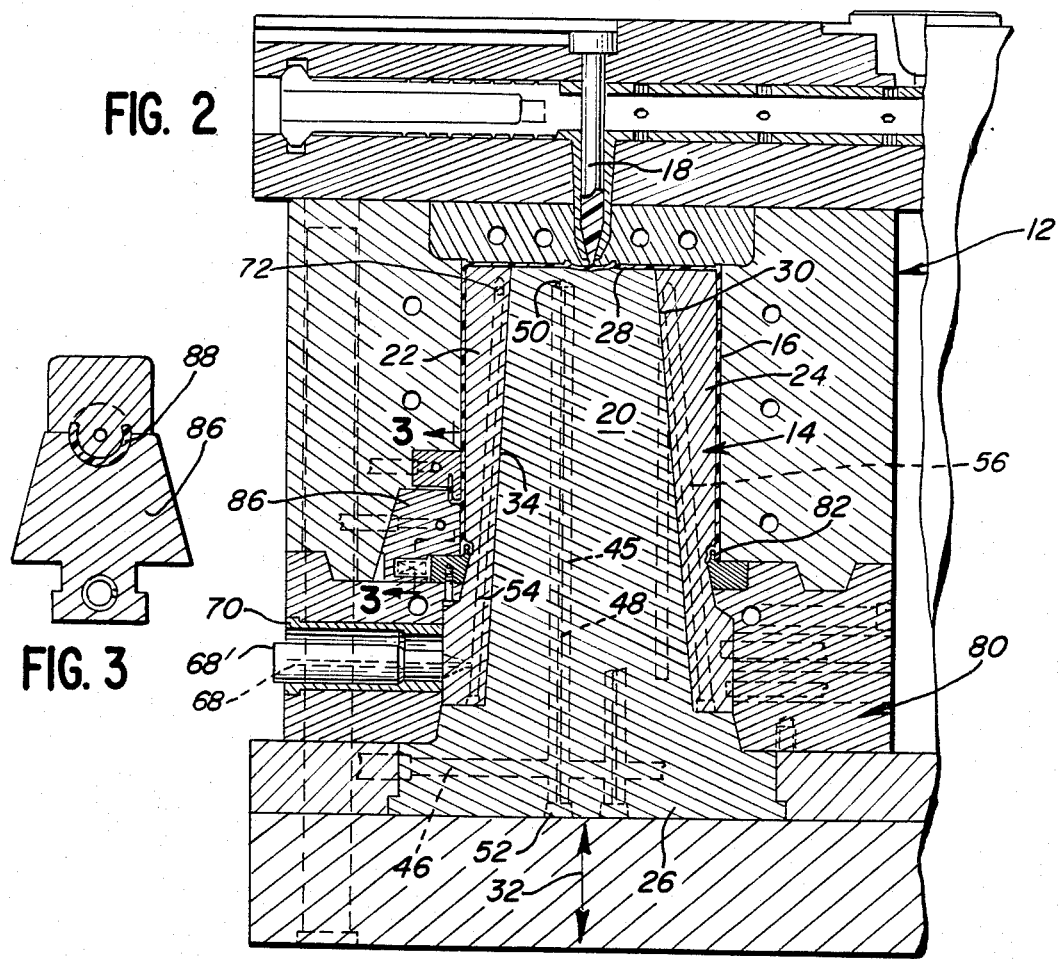
FIG. 2
FIG. 3

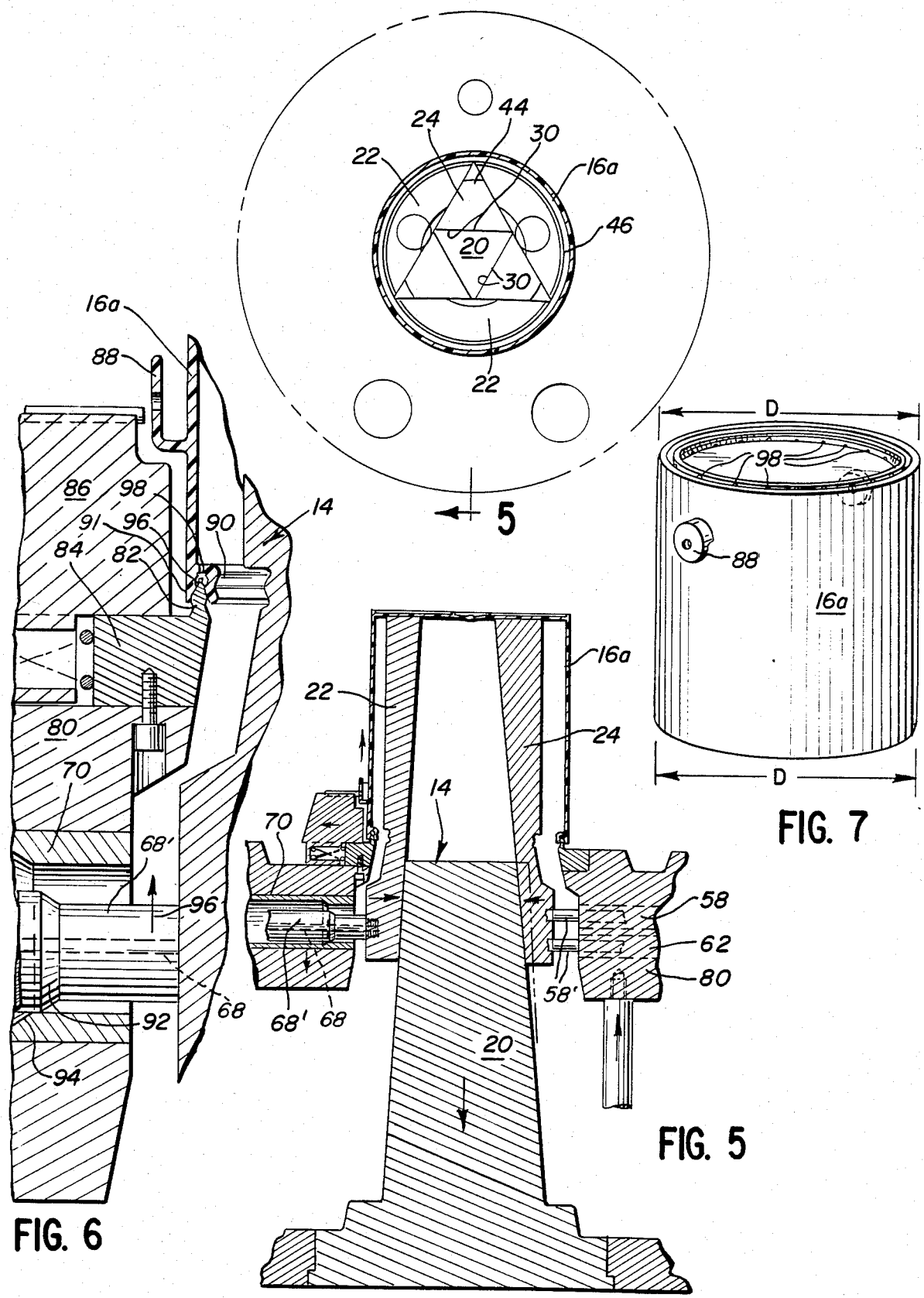

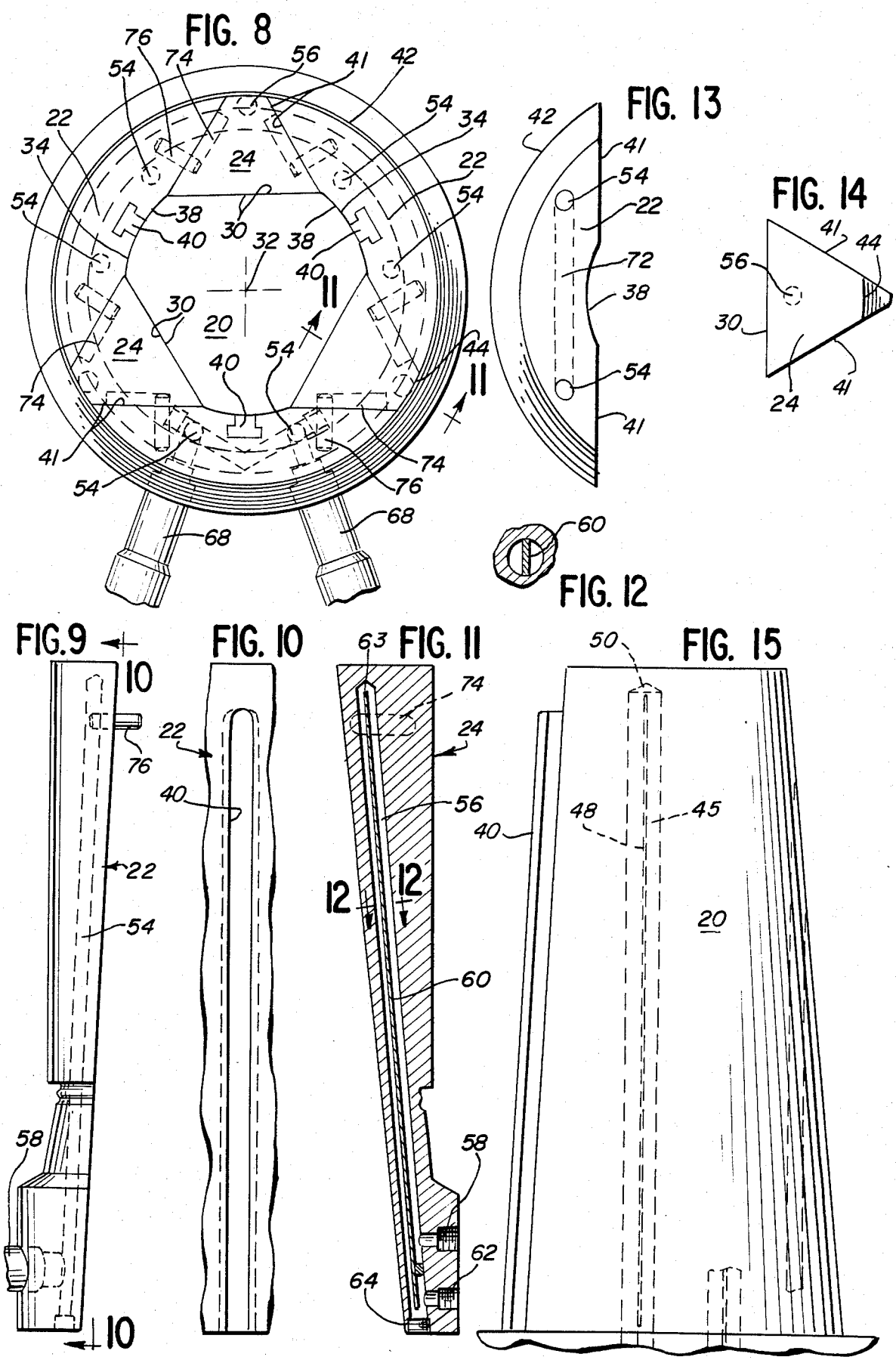

SIMPLIFIED COLLAPSIBLE MOLD CORE

BACKGROUND OF THE INVENTION

This application relates to an improved collapsible mold core which permits the manufacture of straight-walled buckets, for example, in which the bucket lip has an inwardly-projecting rim that would seriously interfere with the removal of the bucket from a noncollapsible core. The collapsible mold core may also be used for the manufacture of any other desired molded device, particularly those having inwardly projecting members so that a collapsible core is required.

In U.S. Pat. No. 4,286,766 a collapsible mold core is disclosed having an inner core member of the shape of a conical section, surrounded by eight sliding members which fit around the conical core and slide in longitudinal manner along the core between the collapsed and molding positions to first permit the molding of a bucket and then to permit its removal as the core moves between its respective two positions.

In the mold core of the above-cited patent, the eight outer core elements comprise four larger outer core elements and four smaller outer core elements arranged in alternating sequence about the conical inner core. The smaller of the outer core elements are generally triangular in cross section, with their two inwardly-facing angles defining delicate feather edges, because the inner core-facing surfaces of these smaller outer core members are concave in shape, so that their angular edges define a very small angle. Such parts are difficult to manufacture with good accuracy because of the difficulty of machining the concave surfaces, and also they are subject to wear and breakage because of the inherent fragility of the feather edges.

In accordance with this invention an improved collapsible mold core is provided having an inner core member and a plurality of outer core members which slide longitudinally along the inner core member. However, in accordance with this invention, the outer core member parts are easier to fabricate, having fewer curved surfaces, and also are sturdier since they do not require the feather edge of the previous design. Likewise, by this invention, only six outer core elements are required rather than the eight outer core elements of the prior art, resulting in a significant reduction in the cost and complexity of the collapsible core.

Furthermore, in accordance with this invention, means are provided for forming a seal groove about the bucket lip with apparatus that permits the easy and automatic removal of the freshly molded bucket from the seal groove-forming fixture. In the past this has proven to be a difficulty in that the newly molded seal groove can be tightly retained in its fixture, and the bucket could not be easily removed by pneumatic means, which is desirable. A freshly molded, large bucket is still rather soft, and mechanical punch out members can warp and even punch through the bucket during the removal process, since the plastic of the bucket is not completely hardened.

The mold core of this invention also may have water cooling means in the inner core member and all of the outer core members, permitting faster operation.

DESCRIPTION OF THE INVENTION

In accordance with this invention, a collapsible mold core is provided for the molding of buckets or any other hollow plastic member. The mold core may desirably have cylindrical outer walls in its molding configuration, although other configurations may be utilized as well. As is common in the prior art, the mold core is utilized in conjunction with an outer mold half which is typically movable relative to the mold core, for opening and closing of the system, and defining a mold chamber between the two pieces.

The mold core includes an inner core member of the general shape of a truncated cone, but having a plurality of flat surfaces extending essentially the length of the inner core member, and spaced about its periphery. The three flat surfaces each define an angle to the longitudinal axis of the inner core member of about 3° to 9°, preferably about 6°.

A plurality of outer core members are distributed about the inner core member and are slidable in longitudinal relation therewith. Smaller outer core members are of generally triangular cross section, with one face of the triangular cross section positioned in slidable relation with a flat surface of the inner core member. The outwardly facing apex of the triangular cross section is truncated, and defines a portion of the outer periphery of the collapsible core.

Between the smaller outer core members are positioned larger outer core members, which define first concave inner surfaces positioned in slidable relation with convex surfaces of the inner core member, and second flat inner surfaces in slidable relation with the flat sides of the smaller inner core members. The angles between the first inner concave surfaces of the larger outer core members and the corresponding convex surfaces of the inner core member preferably define angles to the axis of the core member which are less than the angles of the flat surfaces of the inner core member, preferably about 3°. The effect of this is that, as the outer core members are moved from their molded to their collapsed position, the smaller outer core members collapse inwardly at a faster rate than the larger outer core members, which facilitates the collapse of the entire structure in a manner similar to that described in the previously cited patent.

The outer surfaces of the larger outer core members cooperate with the truncated outer surfaces of the smaller outer core members to define the entire outer surface of the collapsible core. When in the molding position, the respective outer surfaces typically fit together in a tight configuration, to define a complete cylindrical surface. In the collapsed position, the various outer surfaces separate to permit the desired collapsing.

As the result of the above structure, the inner, flat surfaces of the smaller outer core member provide inner angles of the smaller core member cross sections which are larger than the angles of the corresponding parts in the previously cited patent, thus being sturdier, with the inner, flat surfaces being sturdier, with the inner, flat surfaces being easier to manufacture than the corresponding concave surfaces of the prior art patent. Also, in accordance with the present invention, good results can be achieved with only six outer core members, rather than the eight outer core members shown in the prior art patent.

Transversely slidable pin means are provided, vertically connecting the respective adjacent large and small outer core members, so that all of the outer core members move longitudinally or vertically as a single unit, although their radial movement can be independent of each other, being governed by their paths of motion along the outer surface of the inner core member.

Bucket lip forming means may be provided to the apparatus, as stated above. As the result of this, upon desired removal of a bucket from the mold in accordance with the prior art, the annular member which defines an annular trough in the bucket lip may be firmly retained therein as the mold is opened, resulting in difficulties of removing the bucket. In accordance with the present invention, cam means are provided so that as the outer mold members of the collapsible core begin their longitudinal or upward motion, resulting in collapse of the mold and removal of the bucket from the mold core, the inward motion of the mold core pieces actuates cam means, forcing the core pieces to be moved upward relative to the bucket lip forming means, which otherwise moves as a unit with the outer mold core members. The entire structure is carried for example by the stripper plate and is driven upwardly by knock-out rods which actuate the stripper plate. Accordingly, as the motion of mold core collapse proceeds, the cam means described above makes use of the radially inward motion of the outer mold core members to force them to move upwardly a small distance relative to the bucket lip forming means, wholly or partially removing such means from the bucket lip. Following this, the bucket can be more easily removed from the collapsed core, preferably through the use of conventional pneumatic pressure to blow it out of engagement with the core.

Typically, the cam means can be provided by interaction of water inlet members which reside in radially movable manner within bushings in the stripper plate. The water inlet members may be rigidly carried on the larger outer core members, and, as drawn inwardly, a cam in the bushing forces the water member to move in longitudinal manner about one or more millimeters, taking the outer core members with them, to provide relative motion with respect to the rest of the stripper plate as the stripper plate and all it carries is moving upwardly to collapse the mold core.

DESCRIPTION OF THE DRAWINGS

FIG. 1 is a plan view, taken substantially in horizontal section, showing a bucket mold utilizing the collapsible core of this invention;

FIG. 2 is a vertical sectional view taken substantially along line 2—2 of FIG. 1;

FIG. 3 is a fragmentary vertical sectional view taken substantially along the line 3—3 of FIG. 2, showing the mechanism for forming bucket "ears";

FIG. 4 is a plan view of the mold core of this invention in collapsed configuration;

FIG. 5 is a vertical sectional view taken substantially along line 5—5 of FIG. 4;

FIG. 6 is an enlarged, fragmentary vertical sectional view of a portion of FIG. 5;

FIG. 7 is a perspective view of a bucket which can be made in a mold utilizing the mold core of this invention;

FIG. 8 is a detailed plan view of the mold core of this invention;

FIG. 9 is a detailed elevational view of one of the small outer mold core parts;

FIG. 10 is a vertical sectional view taken substantially along line 10—10 of FIG. 9;

FIG. 11 is a vertical sectional view of the small outer mold core part taken substantially along line 11—11 of FIG. 8;

FIG. 12 is a fragmentary sectional view taken along line 12—12 of FIG. 11;

FIG. 13 is a plan view of the larger type of outer mold core part;

FIG. 14 is a plan view of the smaller type of outer mold core part; and

FIG. 15 is a detailed elevational view of the inner mold core part.

Referring now to the drawings, mold 10 for molding buckets is disclosed including an outer mold half 12 which may be of generally conventional design except as otherwise disclosed herein, and collapsible mold core 14 in accordance with this invention, with the two mold portions defining a mold cavity 16 therebetween. As shown, mold core 14 may be used to form a cylindrical walled bucket with mold cavity 16 communicating with sprue channel 18, plus other conventional and well known mold parts which do not need to be discussed.

Collapsible mold core 14 may include an inner core member 20 and a plurality of outer core members, specifically three larger outer core members 22 and three smaller outer core members 24, which are alternatively arranged about the lateral periphery of inner core member 20. As shown in FIGS. 2 and 5, inner core member 20 is tapered from its lower end 26 to its upper end 28, being generally of the shape of a truncated cone into which a plurality of flat, tapered surfaces 30 are defined as best shown in FIGS. 1 and 8. The angle of flat surfaces 30 to the longitudinal axis 32 of mold core 14 is preferably about 6°. Inner core member 20 also defines, between flat surfaces 30, convex surfaces 34 which typically comprise conical sections, as part of the original conical configuration of core 20. These surfaces also taper from end 26 to end 28 of inner core 20 and preferably define an angle of about 3° to axis 32.

Large outer core sections 22 are positioned with inner surfaces 38 (FIG. 8) in sliding relation with the outer conical surface 34 of inner core 20. Key and keyway means 40 are provided to hold large core members 22 in position relative to inner core 20, and to guide the path of longitudinal sliding between the molding position and the collapsed position of the mold core.

Smaller outer core members 24 are spaced between larger outer core members 22. As shown, each of outer core members 22, 24 define facing flat walls 41 in mating, sliding relation, one with the other with walls 41 being typically straight up and down or parallel to longitudinal axis 32. Outer core sections 22, 24 define outer surfaces 42, 44 (see FIG. 8) which are cylindrical sections and fit together as shown in the molding position of FIGS. 1 and 8 to define the cylindrical portion of mold cavity 16.

In FIG. 4, the mold core is shown in its collapsed position, where tapered flat sections 30 of outer core elements 24 have drawn into essentially abutting relation near upper end 28 of the core 20, where there may be no spacing on curved walls 34 between them. Smaller outer core members 24 have retracted radially inwardly along the path defined by faces 30, making room for larger outer core members 22 to also retract inwardly, creating an annular space 46 (see FIG. 4) between the outer periphery of the collapsible core and the newly formed bucket 16a which occupies the space of original mold cavity 16. Accordingly, bucket 16a becomes readily removable from the collapsed mold core.

Inner core 20 may have a number of cooling water ports 45 as shown in FIG. 2 to remove heat from inner core 20 to accelerate the cooling of the hot plastic of each bucket 16a molded therein. Water ports 45 have an inlet 46, and each constitutes a single channel separated by a baffle 48 (see FIG. 2) to define an inlet port side and outlet side of the channel. Water flows in inlet 46 and along port 45 on one side of baffle 48 then around end 50 and down the other side to exit 52.

Each of the outer core portions 22, 24 also includes cooling ports, specifically ports 54 in larger portions 22 (see FIG. 13) and ports 56 in smaller outer portions 24 (see FIG. 14). As shown in FIG. 11, baffle 60 is provided in channel 56 so that liquid can flow into inlet 58 upwardly around the end 63 of baffle 60, then downwardly on the other side, and out exit port 62 if desired, or out end port 64, which may also be present.

Turning to the cooling system of larger outer core portion 22, water port 68 (FIG. 2) is attached to core portion 22 and slides in a rigid bushing 70 as shown in FIGS. 2 and 6, and also FIG. 8. Each water inlet port 68 communicates with a channel 54 which runs longitudinally through outer core portion 22. At the upper end of each of channels 54, a cross channel 72 is provided (see FIG. 13) for communication between the respective channels 54, so that in each individual outer core portion water can flow in one connection 68 and out the other in a steady stream for constant cooling of outer core member 22. While only a single pair of water inlets 68 are shown, it is contemplated that typically each water port 54 in mold core 14 will have a connection with inlet 68, which is of the structure as specifically illustrated in FIGS. 2, 5 and 6.

Each of the facing walls 41 between the larger outer core members 22 and the smaller outer core members 24 carry transversely slidable pin and slot means. In the specific embodiment of FIG. 8, each slot 74 is formed in smaller core member 24 and each pin 76 is carried in larger core member 22 with the slots 74 being arranged to all occupy a horizontal plane substantially perpendicular to vertical axis 32. As a result, outer core members 22 and 24 are locked together to move vertically as a single unit, while still being capable of independent individual radial motion so that the smaller outer core members 24 may move inwardly along flat faces 30 of the inner core 20 and thereby collapse more rapidly than outer core members 22, to avoid binding of the parts.

In accordance with this invention, a generally conventional stripper plate 80 may be modified to facilitate the removal of bucket 16a as molded herein. As shown in FIG. 5, stripper plate 80 may be conventionally raised and lowered, with the outer core elements 22 being carried by stripper plate 80, and inner core 20 being stationary. Outer core elements 24 are vertically supported by elements 22 through the pin and slot connection 74, 76 described above. The lower end of mold cavity 16 may be defined by annular projection 82 as part of ring 84 (FIG. 6) which resides below split ring 86, which can move in conventional manner to facilitate the separation of bail attachment site or "ear" 88 of the molded bucket.

As best shown in FIG. 6, the molded bucket 16a includes on its open end (the lower end as viewed in FIG. 6) a lip defined by an inner, annular lip portion 90 and an outer annular lip portion 91. The mold includes a outer annular projection 82 which projects upwardly from mold ring element 84, and projection 82 is trapped between the inner and outer bucket lip portions 90 and 91 after the mold shot is complete. It is difficult by conventional pneumatic means to blow the molded bucket 16a upwardly from the mold due to the foregoing connection of the bucket lip portion to projection 82. It is therefore a feature of the present invention to provide positive mechanical means for separating bucket lip 90, 91 from projection 82, after which the bucket may be ejected from the mold by conventional pneumatic means.

Referring to FIGS. 5 and 6, when stripper plate 80 is moved upwardly to open the mold, pins 68' which contain passages 68 provide a positive vertical connection between the stripper plate and the larger outer core members 22 (the water lines shown at 58' in FIG. 5 do not afford a positive vertical connection between the stripper plate 80 and the smaller outer core members 24). Therefore, as stripper plate 80 is raised, it raises the larger outer core elements 22, and the latter act through the previously described pin and slot connections shown at 74, 76 in FIG. 8 to raise the smaller outer core members 24. As a result, the upper ends of the outer core elements 22 and 24 acts on the solid bottom of the molded bucket to raise the bucket (see FIG. 5).

It should further be noted that as the outer core elements 22 are raised relative to the inner core 20, they collapse radially as described above. Thus, as the larger outer core elements 22 collapse radially, the pin members 68' collapse radially conjointly with the elements 22, and in this manner pin members 68' move radially inwardly (to the right as viewed in FIGS. 5 and 6) relative to the bushings 70 which are fixed relative to stripper plate 80. As pins 68' move radially inwardly, cam portions 92 on pins 68' (see FIG. 6) ride upwardly over cam section 94 on bushing 70 thereby causing an accelerated upward movement of outer core elements 22 and 24 relative to mold projection 82. In this manner, the bucket 16a is raised vertically so as to separate bucket lip 90, 91 from projection 82. Thereafter, it becomes a simple matter to eject the molded bucket from the mold by conventional pneumatic means.

The particular embodiment of annular projection 82 shows a series of pins 96 (see FIG. 6) which define small vertical holes in what becomes the bottom of the trough of bucket lip 90, 91 when the bucket 16a is inverted in its usual position. This spontaneously provides drain holes 98 (see FIG. 7) so that spilled paint and the like can drain back into the bucket during use. Pins 96 may be distributed about the surface of annular projection 82 in any desired manner, a specific pattern of drain hole arrangement being shown in FIG. 7.

After bucket 16a is removed, the motion of stripper plate 80 is reversed, causing it to retract, to bring outer core members 22, 24 back from their position of FIG. 5 into their molding position of FIGS. 1 and 2. Outer mold portion 12 can then close over mold core 14 for another shot.

Accordingly, an improved collapsible mold core is provided which has numerous advantages over the mold cores of the prior art. The feather edge in the known outer core members 24 is eliminated to provide a mold core that is easier to manufacture, and has greater durability. The number of outer core members is reduced without any loss of advantage or function over that of the prior art. The various outer core elements are easier to manufacture because of less complex shapes and more flat faces. Water can be provided to all of the core sections for better cooling, and, finally, the removal of the bucket may be facilitated by the described modification of the knock-out mechanism, which loosens the seal of the bucket lip from the mold.

The above has been provided for illustrative purposes only, and is not intended to limit the scope of this invention which is as defined in the claims below.

That which is claimed is:

1. In molding apparatus a collapsible mold core and an outer mold half for defining a mold cavity therebetween, and means for placing molten material for molding into the mold cavity, said collapsible core defining outer core members movable between a molding position and a collapsed position to permit removal of the object mold, container lip forming means carried in said mold including an annular member extending axially of said core for defining an annular trough in said container lip, said container lip forming means and outer core members being movable by stripper plate means while the remainder of said core member is stationary, and further including cam means actuatable as said outer core members move longitudinally and inwardly in the motion of mold collapse to force said outer core members to move forward relative to said container lip forming means as the mold is opened.

2. The mold system of claim 1 in which water inlet means communicate with interior channels in the outer core members, said water inlet means being carried in bushing means and movable therein, said cam means being formed in said bushing means and said water inlet means to force the water inlet means and outer core members relatively forward compared with the container lip forming means as said mold core collapses.

3. A collapsible mold core for use with an outer mold half for defining a mold cavity therebetween and means for placing molten material for molding into the mold cavity, said collapsible core comprising an inner core member of the general shape of a truncated cone but having a plurality of flat surfaces extending essentially the length of said inner core member and spaced about its periphery, said flat surfaces each defining an angle to the longitudinal axis of the inner core member of essentially 3° to 9°; a plurality of outer core members distributed about said inner core member and slidable in longitudinal relation therewith to form a molding configuration in a first position and the collapsed configuration in the second position, said outer core members defining smaller outer core members of generally triangular cross section and larger outer core members positioned between the smaller outer core members, one face of the triangular cross section of the outer core members being positioned in slidable relation with the flat surface of the inner core member, the outwardly facing apex of the triangular cross section being truncated to define a portion of the outer periphery of said collapsible core, said larger outer core members defining first inner surfaces positioned in slidable relation to the surfaces of said inner core member, and second inner surfaces in slidable relation with the sides of the smaller inner core members, the angle between said first inner surfaces and the corresponding surfaces of said inner core member defining an angle to the core member axis which is less than the angle of said flat surfaces of said inner core member; key and groove means positioned to lock said larger outer core members to said inner core member in a manner to permit longitudinal sliding of said outer core members, and transversely slidable pin means disposed such as to connect adjacent large and smaller outer core members, to cause said outer core members to move longitudinally as a single unit while permitting free and independent radial movement.

4. The mold core of claim 3 in which said outer mold half is present, plus means for injecting molten plastic into the mold cavity defined between said collapsible core and mold half in the closed position, container lip forming means being provided including an annular member which defines an annular trough in a container lip, and cam means actuatable as said outer core members move longitudinally and inwardly in the motion of mold collapse to force said outer core members to move forward relative to said bucket lip forming means as said mold in opened.

5. The molding apparatus of claim 4 in which said container lip forming means and the outer core members are movable by stripper plate means, said inner core member being stationary, water inlet means communicating with interior channels in said larger outer core members, said water inlet members being carried in bushing means and movable therein, said cam means being formed in said bushing means and said water inlet means to force the water inlet means and outer core members relatively forward compared with the bucket lip forming means as the mold core collapses.

6. The mold system of claim 5 in which said angle of said first inner surfaces is approximately 3° while the angle of the flat surfaces of said inner core is approximately 6°.

7. A collapsible mold core for use with an outer mold half for defining a mold cavity therebetween and means for displacing molten material into the mold cavity for molding a part, said collapsible mold core comprising, in combination, central inner core means of the general shape of a truncated cone but having a plurality of substantially flat surfaces extending along the length of said inner core means in circumferentially spaced relation, a first plurality of outer core elements, one in engagement with each of said flat surfaces for longitudinal sliding movement relative to said flat surfaces, said flat surfaces being tapered relative to the longitudinal axis of said central inner core means, and a second plurality of outer core elements positioned around said central inner core means intermediate said first outer core elements and equal in number thereto, the outer surfaces of said first and second plurality of outer core elements together defining a generally cylindrical surface when in their expanded molding position, said central inner core means having arcuate surfaces intermediate said flat surfaces and said second plurality of outer core elements being in engagement with corresponding ones of said arcuate surfaces for longitudinal sliding movement relative to said arcuate surfaces, said first and second outer core elements being slidable relative to said central inner core means in one direction to form a molding configuration and in a second direction to define a collapsed configuration, said first plurality of outer core elements being interconnected with said second plurality of outer core elements by pins extending between side elements so that said second plurality of outer core elements vertically supports said first plurality of outer core elements.

8. A collapsible core mold as defined in claim 7 where there are three of said first plurality of outer core elements and three of said second plurality of outer core elements.

9. A collapsible core mold as defined in claim 7 where said first plurality of outer core elements comprise generally triangular shaped elements with flat inner surfaces, the outer surfaces of said outer core elements being arcuate, and said flat inner surfaces being tapered longitudinally to correspond to the taper of said flat surfaces on said central inner core means.

10. A collapsible mold core as defined in claim 11 where said second plurality of outer core elements are keyed to said central inner core means for guided longitudinal sliding movement relative thereto, and said first plurality of outer core elements float relative to said central inner core means without being keyed thereto.

11. A collapsible mold core for use with an outer mold half for defining a mold cavity therebetween and means for placing molten material into the mold cavity for molding a part, said collapsible mold core comprising, in combination, central inner core means of the general shape of a truncated cone but having three flat surfaces extending along the length of said inner core means in circumferentially spaced relation, a first set of three outer core elements, one in engagement with each of said flat surfaces for longitudinal sliding movement relative to said flat surfaces, said flat surfaces being tapered relative to the longitudinal axis of said central core member, said first set of outer core elements each being generally triangular shaped elements with flat inner surfaces, the outer surfaces of said first set of outer core elements being arcuate, said flat inner surfaces being tapered longitudinally to correspond to the taper of said flat surfaces on said inner core means, and a second set of three outer core elements positioned around said central inner core means intermediate said first set of outer core elements, the outer surfaces of said first and second sets of outer core elements together defining a generally cylindrical surface when in their expanded molding position, said central inner core means having arcuate surfaces intermediate said flat surfaces, and said second set of outer core elements being in engagement with corresponding ones of said arcuate surfaces for longitudinal sliding movement relative to said arcuate surfaces, said first and second sets of outer core elements being slidable relative to said central inner core means in one direction to form a molding configuration and in a second direction to define a collapsed configuration said first set of outer core elements being interconnected with said second set of outer core elements by pins extending therebetween so that said first set of outer core elements are vertically supported by said second set of outer core elements.

12. A collapsible mold core as defined in claim 11 where said second set of outer core elements are keyed to said central inner core means for guided longitudinal sliding movement relative thereto, and said first set of outer core elements float relative to said central inner core means without being keyed thereto.

* * * * *